No. 12,321. REISSUED FEB. 21, 1905.
J. G. CROSBY.
WATER CLOSET TANK.
APPLICATION FILED MAR. 11, 1902.
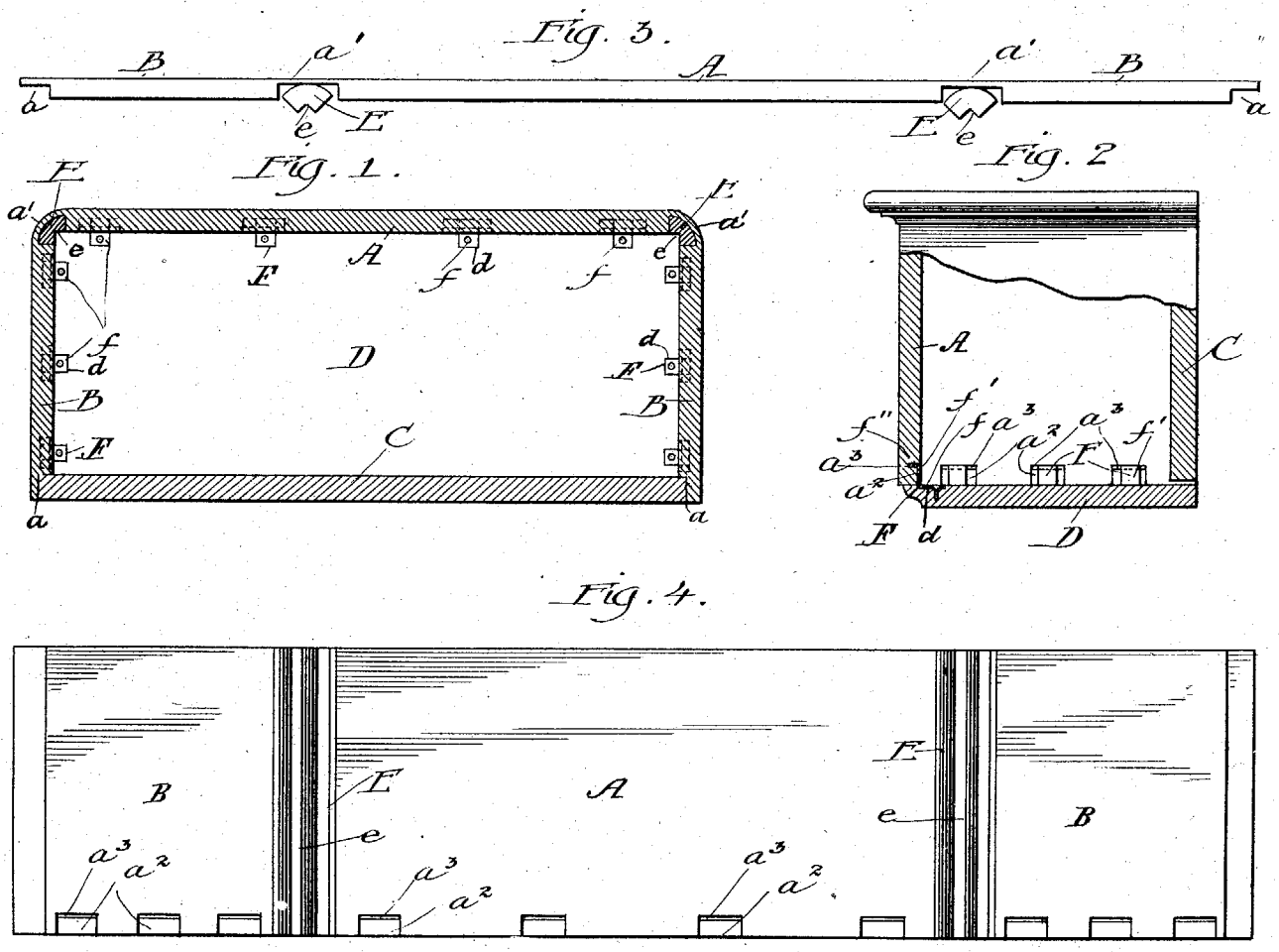
Witnesses:
Frank S. Blanchard
Bella Evans.
Inventor:
Joseph G. Crosby
By L. M. Hopkins
Attorney.
PHOTO-LITHOGRAPHED BY SACKETT & WILHELMS LITHO. & PTG. CO. NEW YORK.

No. 12,321. Reissued February 21, 1905.

UNITED STATES PATENT OFFICE.

JOSEPH G. CROSBY, OF PORT HURON, MICHIGAN.

WATER-CLOSET TANK.

SPECIFICATION forming part of Reissued Letters Patent No. 12,321, dated February 21, 1905.

Original No. 686,592, dated November 12, 1901. Application for reissue filed March 11, 1902. Serial No. 97,783.

*To all whom it may concern:*

Be it known that I, JOSEPH G. CROSBY, a citizen of Great Britain, formerly residing at Northville, in the county of Wayne, and now residing at Port Huron, in the county of St. Clair, State of Michigan, have invented certain new and useful Improvements in Water-Closet Tanks, of which the following is a specification.

The present invention relates to that class of water-closet tanks that consist of an outer box or casing of wood and an inner lining of sheet metal, which is made water-tight and is, in fact, a tank complete in itself, requiring only the support and protection that are afforded by the box or casing.

The object of the invention is to provide means for so attaching the bottom of the casing to the vertical walls thereof that unequal expansion and contraction may take place without splitting any of the parts or straining any of the joints. To this end I connect the bottom and vertical walls by angle-irons, which are so secured to the wooden parts as to permit of their relative movement.

To this end the invention consists in the features of novelty that are herein described.

In the accompanying drawings, which are made a part of this specification, Figure 1 is a horizontal section of a tank-casing embodying the invention. Fig. 2 is a view thereof, partly in end elevation and partly in vertical section. Fig. 3 is an edge view, and Fig. 4 an inner face view, of the grooved board from which the front and ends of the casing are formed, the corner-posts being shown in place in the grooves—the positions they occupy at the commencement of the bending operation.

A represents the front, B the ends, C the back, and D the bottom, of the casing in its complete condition in readiness to receive the inner sheet-metal lining, which is not shown. The front and ends are formed of a single piece of board of appropriate length, width, and thickness, which is rabbeted at its ends, as shown at *a*, to receive the ends of the back C. At intermediate points where the front corners are to be formed the board is provided with transverse grooves of equal depth from side to side, which materially reduce it in thickness and leave thin veneers $a'$, that can be easily bent around and in direct contact with the corner posts or strips E. These corner-posts are curved on their outer faces and are provided in their inner faces with rectangular grooves *e*, the surfaces of which are flush with the inner surfaces of the front and ends of the casing, so that the interior of the casing has but four rectangular corners and is adapted to receive within it a sheet-metal tank or lining of similar shape and of the full internal dimensions of the casing. In order to secure this result and at the same time leave sufficient stock between the bottoms of the rectangular grooves *e* and the outer surfaces of the posts to maintain their integrity and strength, it is necessary to make the front and ends of the casing of such thickness that the projected planes of their inner surfaces will (at each corner) intersect each other at a point within and a considerable distance from the outer curved surface of the post. It is manifest that if these planes were to intersect at a point outside of the curve which defines the outer surface of the post an integral post would be impossible and two separate strips would have to be used. The corners would then depend for their strength wholly upon the veneers $a'$, and these would be inadequate.

The bottom D is secured to the front and end walls by angle-irons F. The horizontal arm $f$ of each angle-iron is countersunk in a depression $d$ in the bottom and is there secured, while its vertical arm $f'$ is countersunk in a depression $a^2$ in the vertical wall and is bent outward to form a tongue $f''$, which occupies an elongated slot $a^3$ in said wall. By this means a relative movement between the angle-irons and walls of the casing is permitted, so that unequal expansion and contraction of the bottom and vertical walls of the casing can do no damage.

What I claim as new, and desire to secure by Letters Patent, is—

1. In a casing for water-closet tanks, the combination with angularly-related vertical front and end walls and the bottom overlapping their lower edges, of angle-irons located within the tank and connecting said walls and bottom, means for permitting the relative movement of each of the angle-irons and one of the two parts which it connects whereby each of said walls may expand and contract in the direction of its length and in doing so move relatively to the bottom, and a rear wall connected to the end walls and independent of the bottom, substantially as described.

2. In a casing for water-closet tanks, the combination with the vertical walls and the bottom, of angle-irons secured to the bottom and having tongues engaging the walls, said walls having elongated slots into which said tongues project, substantially as described.

3. In a casing for water-closet tanks, the combination with the angularly-related vertical walls and the bottom, overlapping their lower edges of angle-irons connecting the walls and bottom, the walls and bottom being provided with recesses in which said angle-irons are countersunk, and means for permitting the relative movement of said angle-irons and one of the two parts which they connect so that each of said walls may expand and contract lengthwise and in so doing move relatively to the bottom, substantially as described.

JOSEPH G. CROSBY.

Witnesses:
W. L. JENKS,
GEO. S. CLARK.